US012719300B2

(12) United States Patent
Haugh et al.

(10) Patent No.: US 12,719,300 B2
(45) Date of Patent: Aug. 25, 2026

(54) SYSTEMS FOR AND METHODS OF SUPER CAPACITOR CHARGING

(71) Applicant: Tyco Fire & Security GmbH, Neuhausen am Rheinfall (CH)

(72) Inventors: Julianne Frances Haugh, Milwaukee, WI (US); Krista Rene Dorner, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/902,746

(22) Filed: Sep. 30, 2024

(65) Prior Publication Data

US 2026/0095062 A1 Apr. 2, 2026

(51) Int. Cl.
*H02J 9/06* (2006.01)
*H02J 7/34* (2006.01)
*H02J 7/50* (2026.01)
*H02J 7/96* (2026.01)

(52) U.S. Cl.
CPC ................ *H02J 9/06* (2013.01); *H02J 7/345* (2013.01); *H02J 7/50* (2026.01); *H02J 7/96* (2026.01); *H02J 2207/50* (2020.01)

(58) Field of Classification Search
CPC ...... H02J 9/06; H02J 7/007182; H02J 7/0013; H02J 7/345; H02J 2207/50
See application file for complete search history.

(56) References Cited

U.S. PATENT DOCUMENTS 5,498,951 A 3/1996 Okamura et al.
5,744,923 A 4/1998 Strauss et al.
6,384,579 B2 5/2002 Watanabe
7,023,163 B2 4/2006 Charles et al.
7,671,569 B2 3/2010 Kolb et al.
8,138,706 B2 * 3/2012 Ochsenbein .......... H02J 7/0016 318/563
8,242,624 B2 8/2012 Brookfield
9,041,361 B2 5/2015 Viancino et al.
9,379,577 B2 6/2016 Stupka
10,461,559 B2 10/2019 Armstrong
2011/0270544 A1 11/2011 Kucera et al.
2013/0113441 A1 * 5/2013 Narita ................ F16K 37/0083 320/167
2014/0062200 A1 3/2014 Stupka
2015/0340882 A1 11/2015 Göth
2016/0061468 A1 3/2016 Alexander et al.
(Continued)

FOREIGN PATENT DOCUMENTS

EP 2 005 504 A1 12/2008
JP 4022362 B2 12/2007

OTHER PUBLICATIONS

CN Office Action for CN Appl. Ser. No. 202210111291.6 dated May 29, 2025 (9 pages).
(Continued)

*Primary Examiner* — Carlos Amaya
(74) *Attorney, Agent, or Firm* — Foley & Lardner LLP

(57) ABSTRACT

A system for and of charging a capacitor can be used in a failsafe device. A voltage level is sensed at the capacitor, and a current is provided to the capacitor until a threshold voltage level is reached. The threshold voltage level is above a target voltage. The target voltage is a voltage level associated with enough energy being stored for a failsafe operation.

20 Claims, 6 Drawing Sheets

(56) References Cited

U.S. PATENT DOCUMENTS

| | | | | |
|---|---|---|---|---|
| 2016/0276868 | A1* | 9/2016 | Stupka ...................... | H02J 9/00 |
| 2017/0293293 | A1 | 10/2017 | Brownie et al. | |
| 2017/0295058 | A1 | 10/2017 | Gottschalk et al. | |
| 2020/0091747 | A1 | 3/2020 | Merkl et al. | |
| 2022/0155384 | A1 | 5/2022 | Lovati et al. | |

OTHER PUBLICATIONS

CN Office Action for CN Appl. Ser. No. 202210111291.6 dated Aug. 31, 2024 (18 pages).
EP Search Report on EP Appl. Ser. No. 22154414.1 dated Jun. 13, 2022 (9 pages).
Liu et al., "Review on reliability of supercapacitors in energy storage applications," Applied Energy, Aug. 12, 2020, vol. 278, No. 115436 (13 pages).
Schachner et al., "Comparison of Energy Harvesting Concepts for Heating, Ventilation and Air Conditioning Systems," IECON 2018—44th Annual Conference of the IEEE Industrial Electronics Society, IEEE, Oct. 21, 2018 (pp. 6235-6240).
CN Office Action for CN Appl. Ser. No. 202210111291.6 dated Sep. 19, 2025 (12 pages).
CN Office Action for Appl. Ser. No. CN 202210111291.6 dated Feb. 6, 2026 (12 pages).
CN Office Action for CN Appl. Ser. No. 02210111291.6 dated Jun. 3, 2026 (15 pages).

* cited by examiner

SYSTEMS FOR AND METHODS OF SUPER CAPACITOR CHARGING

CROSS-REFERENCE TO RELATED PATENT APPLICATIONS

This application is related to U.S. patent application Ser. No. 18/760,990, filed on Jul. 1, 2024, which is a continuation-in-part of U.S. patent application Ser. No. 17/587,869, filed on Jan. 28, 2022, which claims the benefit of and priority to U.S. Provisional Application No. 63/144,446, filed on Feb. 1, 2021 and which is also a continuation-in-part of U.S. patent application Ser. No. 16/574,806, filed on Sep. 18, 2019, which claims the benefit of and priority to U.S. Provisional Application No. 62/733,584, filed on Sep. 19, 2018. The above-referenced applications are incorporated by reference herein in their entireties.

BACKGROUND

The present disclosure relates generally to the field of energy storage, and more particularly to systems for and methods of charging or providing energy to energy storing devices including but not limited one or more super capacitors.

Super capacitors do not use a conventional solid dielectric, but rather, they use electrostatic double-layer capacitance and electrochemical pseudo capacitance, both of which contribute to the total capacitance of the capacitor. Specifically, electrostatic double-layer capacitors ("EDLC") use carbon electrodes or derivatives with much higher electrostatic double-layer capacitance than electrochemical pseudo capacitance. Separation of charge is achieved in EDLCs by using a Helmholtz double layer. The separation of charge is of the order of a few ångströms (0.3-0.8 nm), much smaller than in a conventional capacitor. By having a much smaller separation of charge, super capacitors are able to have a much greater capacitance than in conventional capacitors.

Super capacitors may be used to supply power (e.g., backup power) for various devices employed in a building management system ("BMS"). A BMS is, in general, a system of devices configured to control, monitor, and manage equipment in or around a building or building area. A BMS may include a heating, ventilation, and air conditioning ("HVAC") system, a security system, a lighting system, a fire alerting system, another system that is capable of managing building functions or devices, or any combination thereof. BMS devices may be installed in any environment (e.g., an indoor area or an outdoor area), and the environment may include any number of buildings, spaces, zones, rooms, or areas. A BMS may include a variety of devices (e.g., HVAC devices, controllers, chillers, fans, lights, safety equipment, sensors, etc.) configured to facilitate monitoring and controlling the building space.

In certain applications, super capacitors can be used as backup energy storage devices for performing failsafe operations in BMS operations as well as other operations. A failsafe operation is an operation where a device is placed in a failsafe position in the event of a power interruption. An example of a failsafe operation is an operation where an action which was performed while power was on is undone in the event of a power loss. To maintain the ability to perform the failsafe operation, the action cannot be performed until sufficient energy is stored to undo that operation. Delays associated with charging an energy source for sufficient energy to perform a failsafe operation are undesirable in certain operations.

SUMMARY

One implementation of the present disclosure is a method of charging a capacitor in a failsafe device. The method includes receiving a voltage level at the capacitor, and providing a current to the capacitor until a threshold voltage level is reached. The threshold voltage level is above a target voltage. The target voltage is a voltage level associated with enough energy being stored for a failsafe operation.

In some embodiments, the threshold voltage level is equal to the target voltage plus an effective series resistance of the capacitor multiplied by the current. In some embodiments, the method also includes sensing an effective series resistance of the capacitor. In some embodiments, the threshold volage level is equal to the target voltage plus the effective series resistance of the capacitor multiplied by the current, and the current is a fixed current.

In some embodiments, the effective series resistance is calculated for the capacitor periodically. In some embodiments, the effective series resistance is sensed for the capacitor periodically. In some embodiments, the method also includes moving an actuator to a failsafe position using energy stored in the capacitor. In some embodiments, the capacitor is a super capacitor. In some embodiments, the capacitor comprises a number of super capacitors. In some embodiments, the super capacitors are coupled in parallel.

Another implementation of the present disclosure is a charger for a capacitor in a failsafe device. The charger includes a circuit configured to provide a current to the capacitor until a threshold voltage level is reached. The threshold voltage level is above a target voltage. The target voltage is a voltage level associated with enough energy being stored for a failsafe operation.

In some embodiments, the charger also includes a sensor configured to sense an effective series resistance of the capacitor. In some embodiments, the threshold volage level is equal to the target voltage plus an effective series resistance of the capacitor multiplied by the current. In some embodiments, the circuit includes a processor configured to execute software instructions for controlling provision of the current. In some embodiments, the circuit includes a current source configured to provide the current. In some embodiments, the circuit includes a fixed current source configured to provide the current as a fixed current.

Another implementation of the present disclosure is failsafe device assembly. The assembly includes an actuator, a capacitor, and a processing circuit including a processor and memory. The memory stores instructions that, when executed by the processor, cause the processing circuit to determine a target voltage associated with an amount of energy stored in the capacitor required to return the actuator from an initial position to a failsafe position, and to provide a current to the capacitor until a threshold voltage level is reached. The threshold voltage level is above the target voltage.

In some embodiments, the memory includes further instructions stored thereon that, when executed by the processor, cause the processing circuit to determine an effective series resistance of the capacitor. In some embodiments, the threshold voltage level is equal to the target voltage plus an effective series resistance of the capacitor multiplied by the current. In some embodiments, the assembly further includes a current source controlled by the processor configured to provide the current. In some embodiments, the capacitor includes one or more super capacitors.

Another implementation of the present disclosure is a failsafe device assembly including an actuator, a capacitor, and a processing circuit including a processor and memory. The memory has instructions stored thereon that, when executed by the processor, cause the processing circuit to provide an amount of energy required to return the actuator to a failsafe position using an adjusted target voltage. In some embodiments, the failsafe device assembly further includes an artificial intelligence module.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
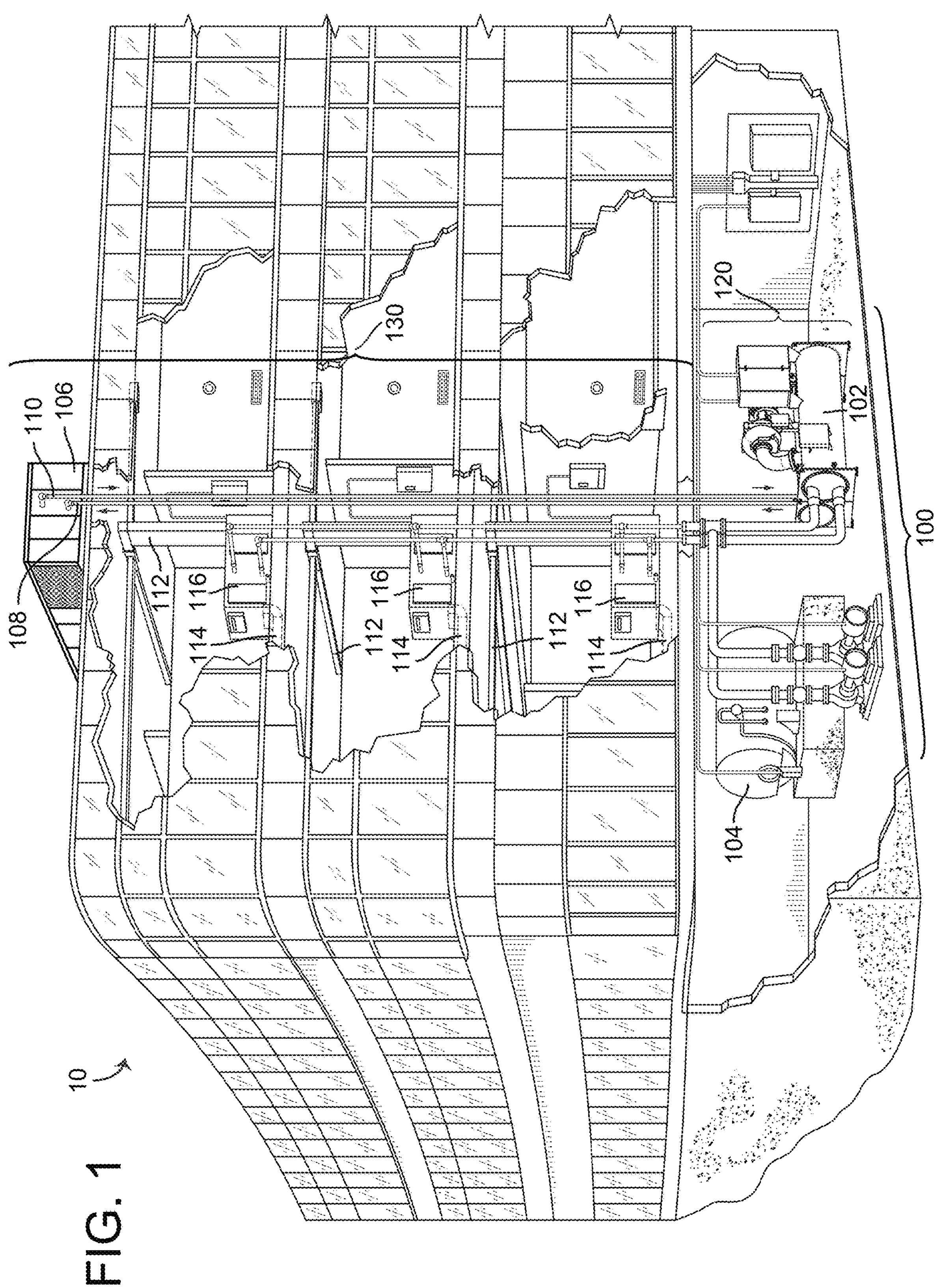
FIG. 1 is a drawing of a building equipped with a HVAC system, according to some embodiments.

Exemplary systems and methods reduce the time needed to appropriately charge a backup energy storage devices, such as super capacitor energy sources. Super capacitors are generally used in applications requiring many rapid charge/discharge cycles rather than long term compact energy storage. For example, super capacitors may be used within cars, buses, trains, cranes and elevators, where they are used for regenerative braking, short-term energy storage, or burst-mode power delivery. In one particular application super capacitors are charged to a target voltage level. The target voltage level is associated with an amount of energy required for a particular task. For example, in a failsafe mechanism, the target voltage level is a level at which the super capacitor stores enough energy to return the failsafe mechanism to its failsafe position.

Super capacitors generally have a "rated voltage." The rated voltage corresponds to a maximum voltage level that should be used to charge the super capacitor. The rated voltage may include a safety margin to prevent accidental decomposition of the electrolyte. The target voltage level is less than the rated voltage in some embodiments.

Some embodiments of systems and methods described herein rapidly recharge the super capacitor so that it stores enough energy for a failsafe or other operation, thereby reducing delays between operations. A processor or other circuit determines charging criteria (e.g., a threshold or desired voltage level) and employs a process that reduces the time needed to reach the appropriate charge level. In some embodiments, a charger provides a fixed current to the super capacitor until a threshold or desired volage is reached. In some embodiments, the threshold volage level is equal to the target voltage plus the effective series resistance of the capacitor multiplied by the current. The current is a fixed current in some embodiments. The effective series resistance can be sensed or determined at initialization, periodically, after discharge, or when needed.

A failsafe operation can be an operation that undoes an action which was performed while power was on in the event of a power loss. In order to maintain the ability to perform the failsafe operation, the action cannot be performed until sufficient energy is stored to undo that operation.

For super capacitors, the target charging voltage is generally a fraction of the maximum working voltage or the rated voltage. The life expectancy of the super capacitor is generally reduced with higher charging voltages (e.g., due to energy storage increasing by the square of the voltage). In some embodiments, the systems and methods operate above the target voltage and below the maximum working voltage or voltage rating of the super capacitor. In some embodiments, a charger is a constant current source charger as opposed to a constant voltage source charger and a constant voltage charging phase is replaced by a constant current phase where the target voltage is increased by the voltage loss within the super capacitor due to series resistance (e.g., desired voltage equals the target voltage plus the charging current multiplied by the effective series resistance of the super capacitor ($V_D=V_T+I_c*R$, where the desired voltage or adjusted target voltage is $V_D$ voltage, $V_T$ is the target voltage, $I_c$ is the charging current, and R is the measured effective series resistance)). Unlike conventional two stage charging schemes, once the desired voltage is reached, removing the charging current results in a super capacitor terminal voltage approximately equal to the target voltage at the terminal, and thus, the desired energy storage is achieved in some embodiments. In conventional two stage charging schemes, removing the charging current results in a terminal voltage less than the desired target by I*R, as calculated above and may require a second stage of shunting or balancing operations. In some embodiments, shunting or balancing operations are not necessary until after the desired voltage is reached (e.g., after the super capacitor is ready for failsafe operations).

Building HVAC Systems and Building Management Systems

Figure 2:
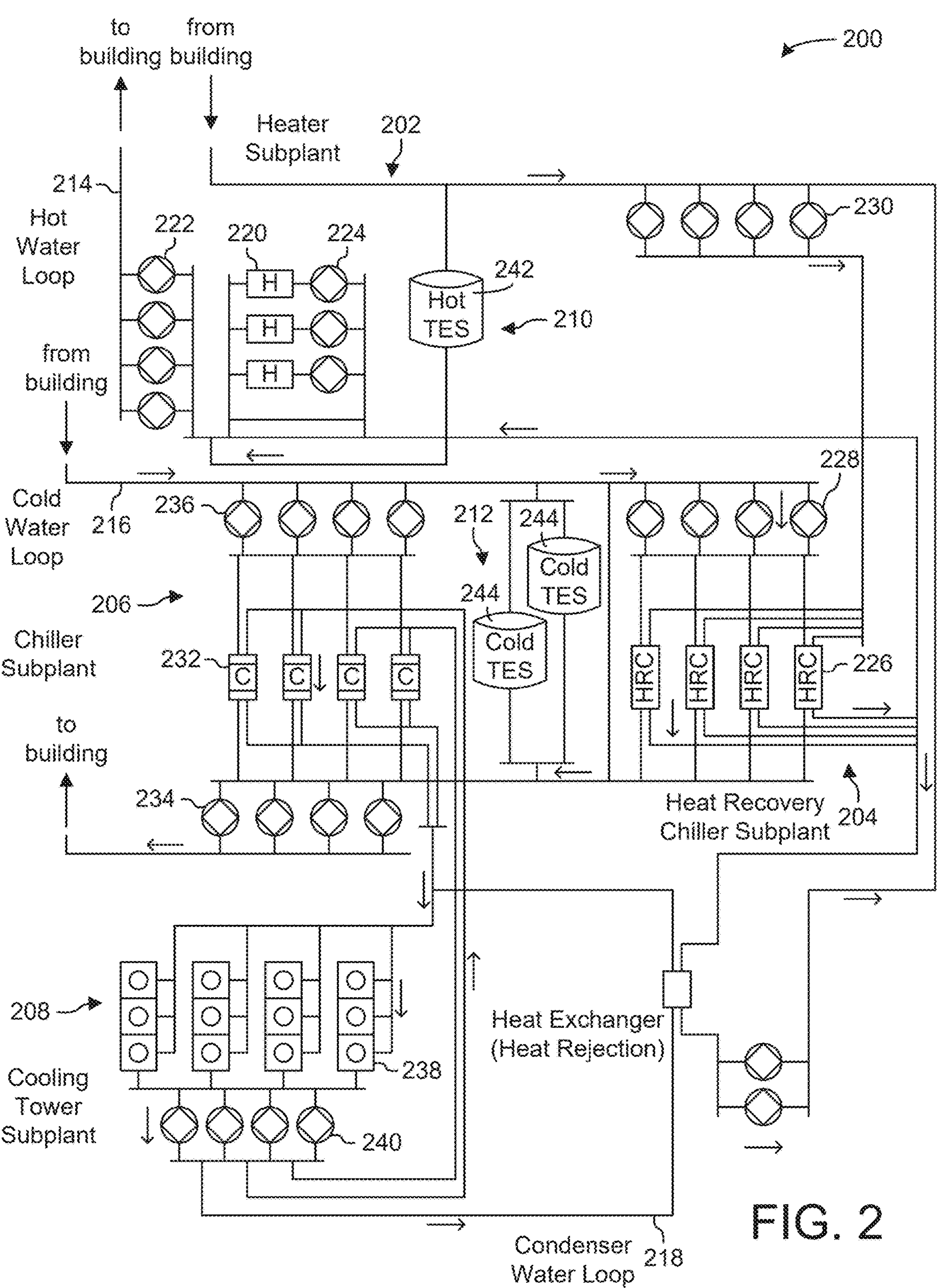
FIG. 2 is a block diagram of a waterside system which may be used to serve the building of FIG. 1, according to some embodiments.
Figure 3:
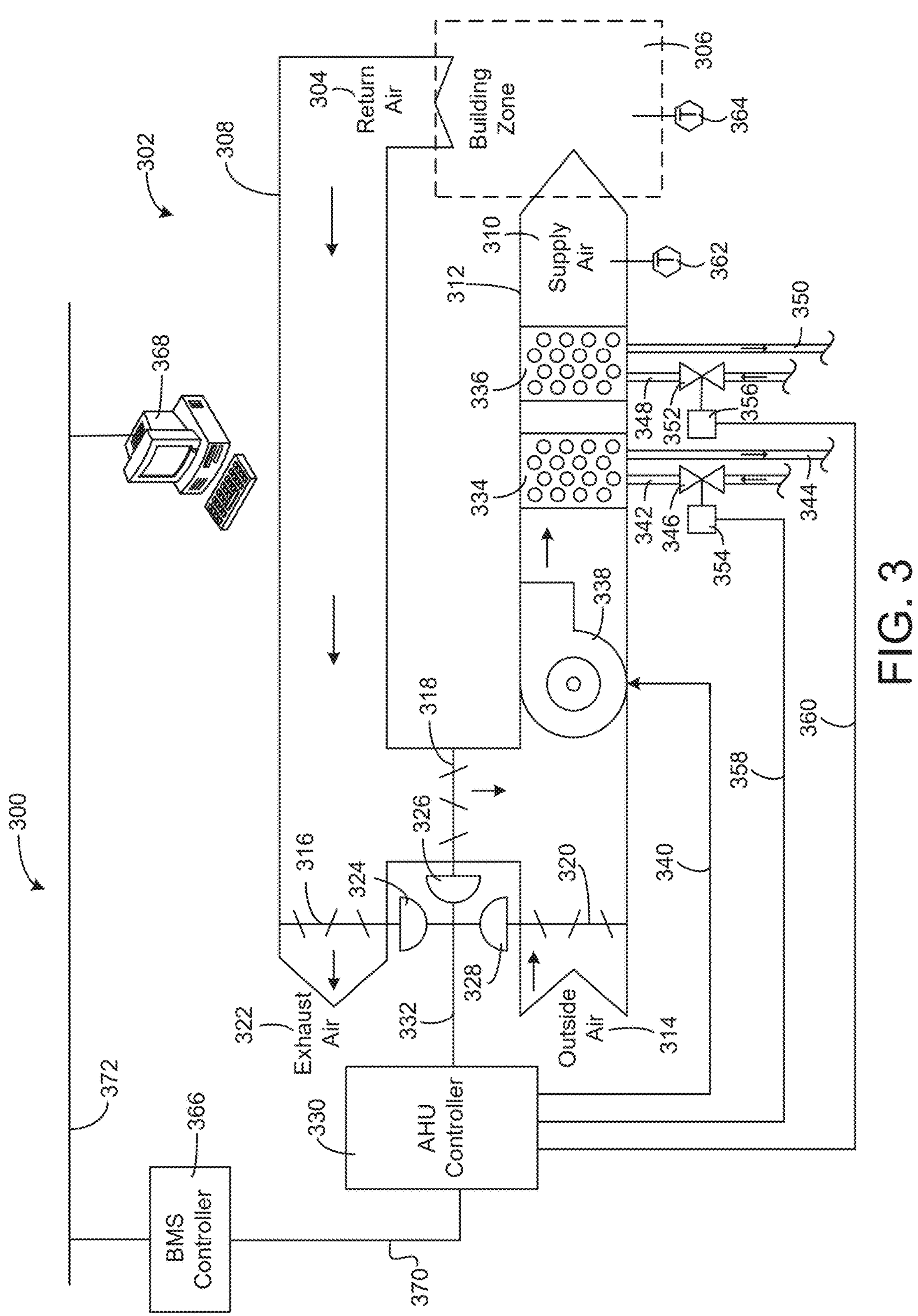
FIG. 3 is a block diagram of an airside system which may be used to serve the building of FIG. 1, according to some embodiments.
Figure 4:
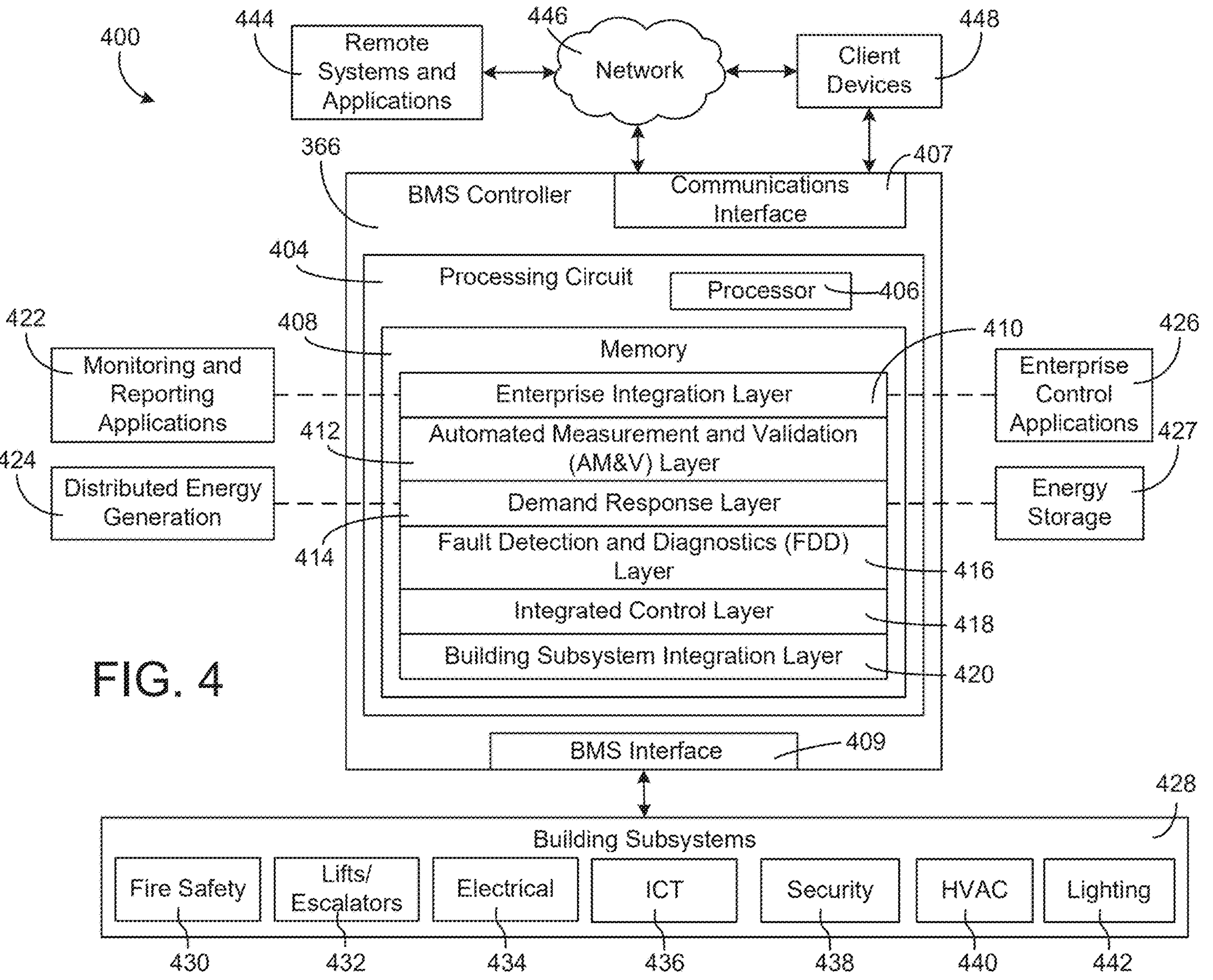
FIG. 4 is a block diagram of a building management system (BMS) which may be used to monitor and control the building of FIG. 1, according to some embodiments.

Referring now to FIGS. 1-4, several building management systems (BMS) and HVAC systems in which the systems and methods of the present disclosure may be implemented are shown, according to some embodiments. In brief overview, FIG. 1 shows a building 10 equipped with a HVAC system 100. FIG. 2 is a block diagram of a waterside system 200 which may be used to serve building 10. FIG. 3 is a block diagram of an airside system 300 which may be used to serve building 10. FIG. 4 is a block diagram of a BMS which may be used to monitor and control building 10. The various equipment, systems, and components of FIGS. 1-4 can be powered by an energy source, such as, a super capacitor which can be charged according to the systems and methods described below in some embodiments.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger including the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 may be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 may include an Ethernet card and port for sending and receiving data via an Ethernet-based communications link or network. In another example, interfaces 407, 409 may include a Wi-Fi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407, 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES tank 242, cold TES tank 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its set point. These processes may be examined by FDD layer 416 to expose when the system begins to degrade in performance and alert a user to repair the fault before it becomes more severe.

Charging an Energy Source

Figure 5:
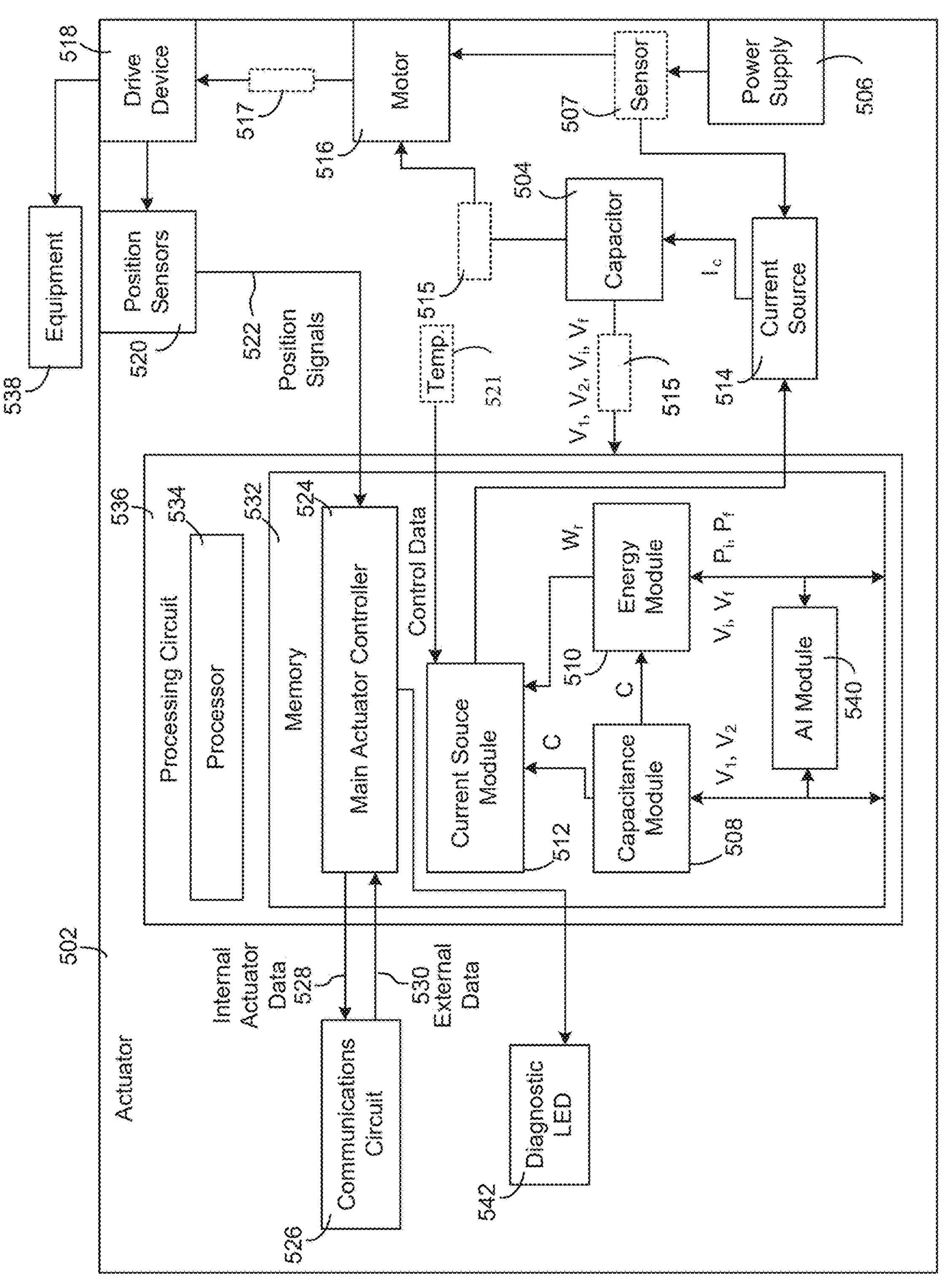
FIG. 5 is a block diagram of an actuator that includes an energy source such as one or more super capacitors, according to some embodiments.
Figure 6:
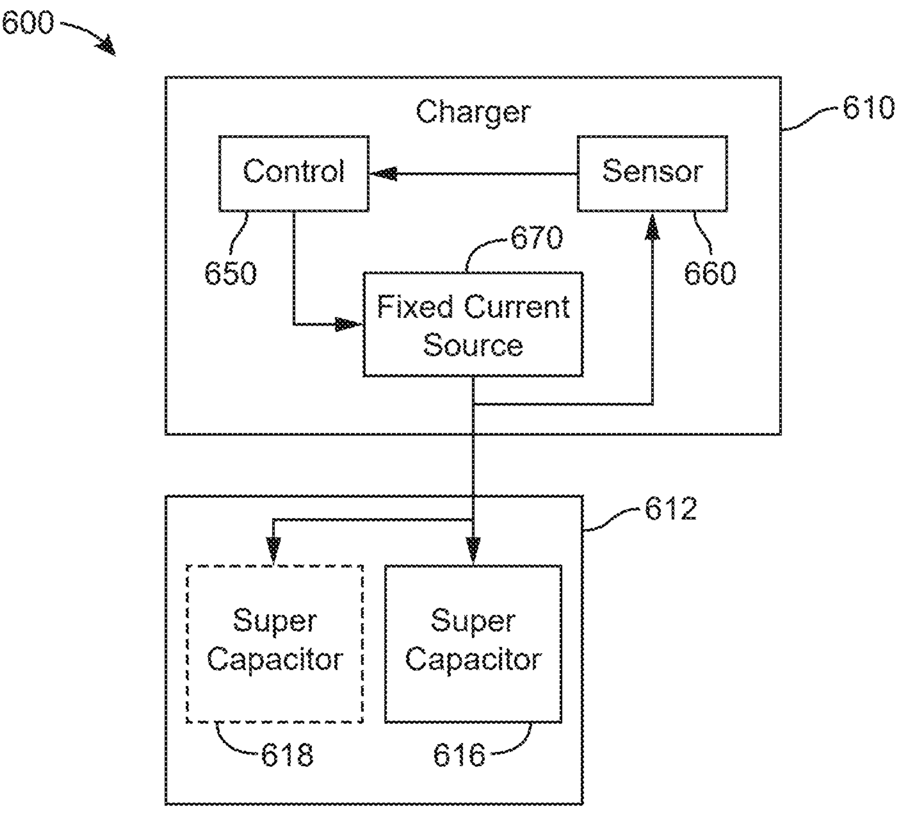
FIG. 6 is a block diagram of a charger which can be used to charge an energy source, such as, one or more of the super capacitors illustrated in FIG. 5, according to some embodiments.
Figure 7:
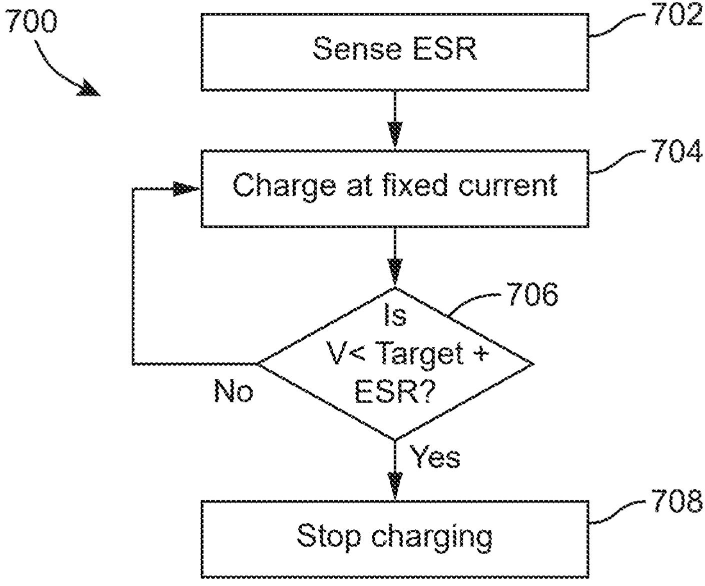
FIG. 7 is a flowchart of a process of charging for an energy source, such as, one or more of the super capacitors illustrated in FIG. 5, according to some embodiments.

Referring now to FIGS. 5-7, various systems and processes for determining a charge voltage and charging a super capacitor are shown, according to some embodiments. In brief overview, FIG. 5 shows a block diagram of an actuator that includes an energy source embodied as a super capacitor. FIG. 6 is block diagram of a charger for the energy source. FIG. 7 is a flowchart of a process for charging the energy source.

Referring particularly to FIG. 5, a block diagram of an actuator that includes a super capacitor with adjustable charge voltage is shown, according to some embodiments. Actuator 502 may be used to service a building (e.g., building 10). For example, actuator 502 may be part of waterside system 200. Actuator 502 may be or may be part of a failsafe device (e.g., a device configured to fail in a specific position when power is removed). In some embodiments, actuator 502 is integrated within a building management system (e.g., BMS 400). For example, actuator 502 may send service request indications to BMS 400. Actuator 502 may charge super capacitor 504 for failsafe operation more quickly than conventional schemes. Actuator 502 can use an equivalent series resistance ("ESR") to determine a desired voltage above a target voltage associated with a desired amount of stored energy in super capacitor 504.

Actuator 502 offers a number of benefits over existing actuators. Actuator 502 may be a failsafe device that includes super capacitor 504 to facilitate driving actuator 502 to a failsafe position in the event of a failure event (e.g., loss of power, etc.). Some failsafe devices typically include a spring to facilitate return to a failsafe position. A spring limits the failsafe position to an extreme (e.g., actuator fully extended, actuator fully retracted). Furthermore, a failsafe device including a spring to facilitate return to a failsafe position requires the failsafe device to continuously fight against the action of the spring. For example, the failsafe device must continuously overcome the action of the spring during normal operation, thereby requiring extra energy to power the failsafe device and making the failsafe device inefficient. Actuator 502 may facilitate return to a failsafe position that is not an extreme (e.g., in-between fully extended and fully retracted). For example, in a three-valve scenario actuator 502 may return to a failsafe position that is in the middle of the three-valve. In various embodiments, actuator 502 does not include a spring to facilitate return to a failsafe position and therefore does not have to fight against the action of the spring, thereby increasing an efficiency of actuator 502 over some conventional failsafe devices.

Actuator 502 also offers a number of benefits over existing capacitive return actuators. Some capacitive return failsafe devices include a capacitor to facilitate return to a failsafe position. Some conventional charging schemes require time to charge the capacitor in a first stage and and time to shunt the capacitor in a second stage. The performance (e.g., capacitance, charge time, maximum voltage rating, etc.) of a capacitor may degrade over time, thereby limiting the capacitors ability to provide energy to drive a failsafe device to a failsafe position. Some capacitive return failsafe devices include an oversized capacitor (e.g., a super capacitor, etc.) to account for capacitor performances losses. For example, an application requiring a 150 Farad capacitor may include a 300 Farad capacitor as a buffer. Oversized capacitors may increase a size and/or cost of the failsafe device. Furthermore, some capacitive return failsafe devices provide no indication of the lifetime of the capacitor. For example, after two years of use, the capacitor in a failsafe device may have degraded to the point that it is unable to provide the energy required to drive the failsafe device to a failsafe position. To continue the example, some failsafe devices do not provide any indication of the degraded capacitor and the user may not know that the failsafe device is unable to return to a failsafe position in a failure event.

In some embodiments, actuator 502 includes super capacitor 504 to facilitate return to a failsafe position. Actuator 502 may measure the lifetime of the super capacitor 504 and provide an indication of the lifetime to a BMS. For example, actuator 502 may measure the effective capacitance of the capacitor as an indication of the lifetime of the capacitor. Furthermore, actuator 502 may measure an amount of energy required to return the failsafe device to a failsafe position and compare the amount of energy to the effective capacitance to determine whether the capacitor is able to provide enough energy to return the failsafe device to the failsafe position. By comparing the effective capacitance to the amount of energy required to return the failsafe device to the failsafe position, actuator 502 may extend the lifetime of the device. For example, a capacitor may degraded from an initial capacity of 300 Farads to an effective capacity of 150 Farads. However, if the amount of energy required to return the failsafe device to the failsafe position only requires an effective capacitance of 80 Farads, then actuator 502 may determine that the capacitor is still functional, thereby prolonging the life of the device.

In various embodiments, actuator 502 may alert a BMS that the device needs to be replaced. For example, actuator 502 may determine a charge voltage required to charge a capacitor with enough energy to return the failsafe device to the failsafe position is too high (e.g., would cause breakdown of the capacitor) and may send an indication to a BMS that actuator 502 and/or the capacitor should be replaced. In some embodiments, the determined charge voltage is compared to a threshold voltage to determine an indication of the lifetime of the capacitor. In some embodiments, actuator 502 may determine a speed with which to drive the failsafe device. For example, based on the measured lifetime, actuator 502 may facilitate a user to select between a first speed and a second speed. The first speed may be associated with a first lifetime (e.g., 60 second stroke/2 years) and the second speed may be associated with a second lifetime (e.g., 120 second stroke/5 years).

In some embodiments, the speed to drive the failsafe device may be dynamically updated and/or selected (e.g., without user intervention) based on the determined capacitor life status. For example, actuator 502 may slow down the speed with which the failsafe device is driven to prolong the life of the device. Additionally, actuator 502 may adjust the charge voltage for the capacitor to prolong the life of the capacitor. Actuator 502 may determine a charge voltage for the capacitor based on comparing the effective capacitance to the energy required to return the failsafe device to the failsafe position. For example, actuator 502 may require a capacitance of 80 Farads at a first charge voltage to return a failsafe device to a failsafe position, but only have an effective capacitance of 60 Farads. However, actuator 502 may determine, based on a comparison of the amount of energy required and the effective capacitance of the capacitor, that the amount of energy required may be achieved with an effective capacitance of 60 Farads at a higher second charge voltage. Therefore, actuator 502 may charge the capacitor up to the second charge voltage. This may prolong the life of the device. Additionally or alternatively, actuator 502 may determine the amount of time needed to charge the capacitor. For example, actuator 502 may determine an effective resistance associated with returning the failsafe device to a failsafe position and an effective capacitance of the capacitor and thereby calculate the time required to charge the capacitor. In some embodiments, actuator 502 may provide diagnostics associated with the operation of actuator 502. For example, actuator 502 may test if the capacitor is able to provide enough energy to drive the failsafe device to the failsafe position. Actuator 502 may provide an indication of the test (e.g., alert a user if the test fails, etc.).

Actuator 502 is shown to include super capacitor 504, power supply 506, current source 514, motor 516, a resistor 517, a drive device 518, position sensors 520, communications circuit 526, and processing circuit 536. In this exemplary embodiment, FIG. 5 is an actuator 502 for building subsystem 428. However, in other embodiments the implementation of a super capacitor is used for a different device. In some embodiments, the device may be a device outside of building subsystems 428 or within a different subsystem of building subsystem 428. For example, instead of being an actuator, the device may be a chiller, a boiler, a rooftop air handling unit (AHU), or other client devices.

Actuator 502 is shown to include a processing circuit 536 communicably coupled to motor 516. In some embodiments, motor 516 is at least one of a brushless DC ("BLDC") motor, a DC stepper motor, a DC brushed motor, and AC brushless motor, or any type of electric motor known in the art. In some embodiments, a DC stepper motor is used for more precise motor control such that the position of the motor is known. Processing circuit 536 is shown to include a main actuator controller 524, memory 532, and a processor 534. Processor 534 may be a general purpose or specific purpose processor, an application specific integrated circuit ("ASIC"), one or more field programmable gate arrays ("FPGA"), a group of processing components, or other suitable processing components. Processor 534 may be configured to execute computer code or instructions stored in memory 532 or received from other computer readable media (e.g., CDROM, network storage, a remote server, etc.).

Memory 532 may include one or more devices (e.g., memory units, memory devices, storage devices, etc.) for storing data and/or computer code for completing and/or facilitating the various processes described in the present disclosure. Memory 532 may include random access memory ("RAM"), read-only memory ("ROM"), hard drive storage, temporary storage, non-volatile memory, flash memory, optical memory, or any other suitable memory for storing software objects and/or computer instructions. Memory 532 may include database components, object code components, script components, or any other type of information structure for supporting the various activities and information structures described in the present disclosure. Memory 532 may be communicably connected to processor 534 via processing circuit 536 and may include computer code for executing (e.g., by processor 534) one or more processes described herein. When processor 534 executes instructions stored in memory 532, processor 534 generally configures actuator 502 (and more particularly processing circuit 536) to complete such activities and controls charging of capacitor 504.

Main actuator controller 524 may be configured to receive external control data at input 530 (e.g., position setpoints, speed setpoints, etc.) from communications circuit 526 and position signals 522 from position sensors 520. Main actuator controller 524 may be configured to determine the position of motor 516 and/or drive device 518 based on position signals 522. In some embodiments, main actuator controller 524 receives data from additional sources. For example, main actuator controller 524 may receive information from sensors (e.g., voltage, current, temperature sensors, humidity sensors, etc.) within building subsystems 428, as described in detail with reference to FIG. 4.

Motor 516 may be coupled to drive device 518. Drive device 518 may be a drive mechanism, a hub, or other device configured to drive or effectuate movement of a HVAC system component (e.g., equipment 538). For example, drive device may be configured to receive a shaft of a damper, a valve, or any other movable HVAC system component in order to drive (e.g., rotate) the shaft. In some embodiments, actuator 502 includes a coupling device configured to aid in coupling drive device 518 to the movable HVAC system component. For example, the coupling device may facilitate attaching drive device 518 to a valve or damper shaft.

The resistor(s) 517 may be in series or in parallel with the capacitor 504 (e.g., in the same branch as the capacitor 504) and may be any type of resistor including a shunt resistor. In some embodiments, the resistor 517 may comprise multiple resistors in the same branch as the capacitor 504. In some embodiments, the resistor 517 may be a shunt resistor configured to drop the output voltage of the capacitor 504 to a predefined input voltage of the motor 516. In some embodiments, the actuator 502 may include a voltage sensor proximate or at the resistor 517 such that the voltage sensor can sense the voltage drop across the resistor 517. Using the known resistance of the resistor 517 and the voltage drop across the resistor 517, current may be determined (e.g., Current (i)=Voltage (V)/Resistance (R)).

Position sensors 520 may include Hall effect sensors, potentiometers, optical sensors, a step counter, an internal time, a back electromagnetic frequency (EMF) sensor, or other types of sensors configured to measure the rotational position of the motor 516 and/or drive device 518. Position sensors 520 may provide position signals 522 to processing circuit 536. Main actuator controller 524 may use position signals 522 to determine whether to operate the motor 516. For example, main actuator controller 524 may compare the current position of drive device 518 with a position setpoint received via external data input 530 and may operate the motor 516 to achieve the position setpoint. In some embodiments, position sensors 520 may be a step counter that receives an indication of the step of the motor 516 or a back EMF sensor that determines the back EMF of the motor 516 and calculates a position of the motor 516 or the drive devices 518. By using a step counter or a back EMF sensor, the position of the motor 516 can be better determined and provided to the main actuator controller 524. In some embodiments, an initial position and/or a failsafe position (e.g., predetermined) is determined using a feedback technique. The feedback technique can use sensor 520 or a motor current measurement. For example, a stall condition can determined by measuring motor current (e.g., an over current condition) which can be used to determine the initial condition or the failsafe position. Sensor 520 or other detectors can be used to determine a stall or over current condition. In some embodiments, only the failsafe position or only the initial condition is determined by detecting the over current condition or stall condition.

Actuator 502 is further shown to include a communications circuit 526. Communications circuit 526 may be a wired or wireless communications link and may use any of a variety of disparate communications protocols (e.g., BACnet, LON, WiFi, Bluetooth, NFC, TCP/IP, etc.). In some embodiments, communications circuit 526 is a circuit configured to output or provide analog communications. For example, communications circuit 526 may provide communications and information regarding the actuator 502 using one or more of pulse width modulated (PWM) wave signals, a saw tooth signal, or any other type of analog signals. In some embodiments, communications circuit 526 may include any required analog to digital converter or digital to analog converter to transform any signals. The analog signal can drive light warnings or audible warnings of life of the capacitor 504. In some embodiments, communications circuit 526 is an integrated circuit, chip, or microcontroller unit ("MCU") configured to bridge communications actuator 502 and external systems or devices. In some embodiments, communications circuit 526 is the Johnson Controls BACnet on a Chip ("JBOC") product. For example, communications circuit 526 may be a pre-certified BACnet communication module capable of communicating on a building automation and controls network (BACnet) using a master/slave token passing ("MSTP") protocol. Communications circuit 526 may be added to any existing product to enable BACnet communication with minimal software and hardware design effort. In other words, communications circuit 526 provides a BACnet interface for actuator 502. Further details regarding the JBOC product are disclosed in U.S. patent application Ser. No. 15/207,431 filed Jul. 11, 2016, the entire disclosure of which is incorporated by reference herein.

Communications circuit 526 may also be configured to support data communications within actuator 502. In some embodiments, communications circuit 526 may receive internal actuator data 528 from main actuator controller 524. For example, internal actuator data 528 may include a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 538 (e.g., a valve), or any other type of data used or stored internally within actuator 502. In some embodiments, communications circuit 526 may transmit external data at input 530 to main actuator controller 524. External data at input 530 may include, for example, position setpoints, speed setpoints, control signals, configuration parameters, end stop locations, stroke length parameters, commissioning data, equipment model data, actuator firmware, actuator software, or any other type of data which may be used by actuator 502 to operate the motor 516 and/or drive device 518.

In some embodiments, external data at input 530 is a DC voltage control signal. Actuator 502 may be a linear proportional actuator configured to control the position of drive device 518 according to the value of the DC voltage received. For example, a minimum input voltage (e.g., 0.0 VDC) may correspond to a minimum rotational position of drive device 518 (e.g., 0 degrees, −5 degrees, etc.), whereas a maximum input voltage (e.g., 10.0 VDC) may correspond to a maximum rotational position of drive device 518 (e.g., 90 degrees, 95 degrees, etc.). Input voltages between the minimum and maximum input voltages may cause actuator 502 to move drive device 518 into an intermediate position between the minimum rotational position and the maximum rotational position. In other embodiments, actuator 502 may be a non-linear actuator or may use different input voltage ranges or a different type of input control signal (e.g., AC voltage or current) to control the position and/or rotational speed of drive device 518.

In some embodiments, external data input 530 is an AC voltage control signal. Communications circuit 526 may be configured to transmit an AC voltage signal having a standard power line voltage (e.g., 120 VAC or 230 VAC at 50/60 Hz). The frequency of the voltage signal may be modulated (e.g., by main actuator controller 524) to adjust the rotational position and/or speed of drive device 518. In some embodiments, actuator 502 uses the voltage signal to power various components of actuator 502. Actuator 502 may use the AC voltage signal received via communications circuit 526 as a control signal, a source of electric power, or both. In some embodiments, the voltage signal is received from a power supply line that provides actuator 502 with an AC voltage having a constant or substantially constant frequency (e.g., 120 VAC or 230 VAC at 50 Hz or 60 Hz). Communications circuit 526 may include one or more data connections (separate from the power supply line) through which actuator 502 receives control signals from a controller or another actuator (e.g., 0-10 VDC control signals).

In some embodiments, actuator 502 is an actuator in building subsystems 428. Alternatively, actuator 502 may be outside of building subsystems 428 (not shown). Actuator 502 may be configured to be connected to capacitor 504 and powered by capacitor 504. Actuator 502 may consume electricity from an electric utility and may also be powered by power supply 506. The initial position ($P_i$) of actuator 502 and the final position ($P_f$) of actuator 502 may be input to memory 532. The initial position ($P_i$) of actuator 502 may be the position of actuator 502 when processor 534 first receives a signal that power is lost to actuator 502 from power supply 506 (e.g., a first indication of no power). The final position ($P_f$) of actuator 502 may be the position of actuator 502 (e.g., an actuator) when actuator 502 returns to a default position.

In some embodiments, super capacitor 504 is configured to provide a processor (e.g., processor 534) with the values of voltages across capacitor 504 at various times. For example, processor 534 may be configured to measure the value of an initial voltage ($V_i$), across capacitor 504 at the time when actuator 502 is in position $P_i$, the value of a final voltage ($V_f$) across capacitor 504 at the time when actuator 502 is in position $P_f$, the value of a first voltage ($V_1$) across capacitor 504 at a first specified time $t_1$, and/or the value of a second voltage ($V_2$) across capacitor 504 at a second specified time $t_2$. In some embodiments, the difference between the first time ($t_1$) and the second time ($t_2$) is a predetermined time. Voltage readings (e.g., $V_i$, $V_f$, $V_1$, $V_2$) may be input to non-volatile memory (e.g., memory 532) to be used in calculations to determine capacitance (C), energy used by actuator 502 to return to its default position ($W_r$), and/or charge voltage ($V_c$). In some embodiments, capacitor 504 is an electrostatic double-layer capacitor ("EDLC") super capacitor that is charged by power supply 506. Power supply 506 may also be configured to power actuator 502. Alternatively, more than one power supply may be configured to power actuator 502 and/or capacitor 504.

In some embodiments, current source module 512 is configured to cause current source 514 to provide a fixed current to super capacitor 504 until a threshold voltage is reached. Current source module 512 is configured to determine a desired charge voltage ($V_D$) (i.e., a voltage level to which super capacitor should be charged at its terminal). For example, current source module 512 calculates $V_D$ and outputs control data to current source 514 in order to provide current $I_C$ to capacitor 504. In some embodiments, current source module 512 receives inputs from capacitance module 508 and energy module 510 within memory 532 that include values for capacitance (C) and energy value ($W_r$), respectively. Using the previously determined values of C and $W_r$, current source module 512 may calculate the value of desired charge voltage $V_D$ using the following equation:

$$V_D = V_T + I_c * R,$$

where the desired voltage or adjusted target voltage is $V_D$, $V_T$ is the target voltage, $I_c$ is the charging current, and "R" is the measured effective series resistance (ESR). The current source 514 provides the charge current $I_C$ until the desired voltage $V_D$ is reached in some embodiments. The series resistance can be sensed using a sensor and/or determined using RC time constants, voltage measurements, current measurements, and device ratings. Current source module 512 can sense the terminal voltage at super capacitor 504 to determine when the threshold voltage is reached. The target voltage can be determined by current source module 512 by the following equation:

$$W_r = 0.5 * V_t^2 * C,$$

where $W_r$ is the energy required for the failsafe operation, $V_T$ is the target voltage, C is the capacitance of super capacitor 504.

The capacitance can be sensed using a sensor and/or determined using RC time constants, voltage measurements, current measurements, and device ratings. In some embodiments, current source module 512 receives inputs from capacitance module 508 and energy module 510 within memory 532 that include values for capacitance (C) and energy value ($W_r$), respectively. Using the previously determined values of C and $W_r$, current source module 512 may calculate the value of desired charge voltage $V_D$. Although the particular equations are shown above, approximations of the values can be utilized. For example. The target voltage can be within a tolerance or slightly above the value calculated above. Deviations from the above equations do not necessarily depart from the scope of the claims according to some embodiments.

In some embodiments, actuator 502 includes a temperature sensor 521 that provides a temperature signal to current source module 512. In some embodiments, the temperature signal or temperature data can be provided by a sensor or data source external to actuator 502. The temperature signal or temperature data can be provided by communications circuit 526 in some embodiments. In some embodiments, current source module 512 uses voltage readings (e.g., $V_i$, $V_f$, $V_1$, $V_2$) and the temperature signal to determine capacitance (C), energy used by actuator 502 to return to its default position ($W_r$), and/or charge voltage ($V_c$). In some embodiments, current source module 512 uses temperature sensor data to determine available stored energy and calculates optimal charge voltage. The temperature data (e.g., temperature feedback) can be used to estimate ESR of the capacitor 504 (e.g., one or more capacitors) in some embodiments. ESR can impact the speed and/or torque available to the motor by way of the discharge current available. Similarly and in some embodiments, the temperature data is used to calculate maximum charge current at a given temperature, which is used to calculate a dynamic charging time (i.e. colder or hotter temperatures take longer for charge to complete, etc.). Current source module 512 can be implemented in software, hardware, or combination thereof (e.g., as programmable logic, an ASIC, processor, analog circuit, etc.).

In some embodiments, capacitor 504 transmits diagnostic information. For example, actuator 502 may test that capacitor 504 has enough energy to return a failsafe device (e.g., drive motor 516) to a failsafe position and report upon the test. In some embodiments, the test may occur periodically (e.g., every time actuator 502 is powered down, etc.). For example, upon power down, capacitor 504 may power motor 516 to move drive device 518 to a failsafe position and position sensors 520 may determine if capacitor 504 was able to do so. In response, actuator 502 may provide diagnostic information to a user and/or BMS controller 366. In some embodiments, the diagnostic information may indicate that capacitor 504 and/or actuator 502 need to be replaced. In some embodiments, actuator 502 includes a sensor 507 in line with power supply 506, for measuring the current and/or voltage provided by power supply 506, which can be used to determine the energy provide to actuator 502, and thereby the energy consumption of actuator 502. Accordingly, sensor 507 may be any suitable sensor for measuring current, voltage, or energy consumption, such as a Hall effect sensor.

In some embodiments, the actuator 502 may provide a visual indication of any diagnostic information (e.g., via a diagnostic LED 542). The diagnostic LED 542 may be communicably coupled to the main actuator controller 524 and receive an indication of the diagnostic status of the capacitor 504 and/or the actuator 502. Furthermore, the diagnostic LED 542 may then be illuminated in a specific diagnostic color. For example, the diagnostic LED 542 may light up specially as: red=maintenance needed (e.g., change capacitor 504 immediately), yellow=maintenance needed soon (e.g., change capacitor soon), and green=no maintenance needed (e.g., capacitor is working correctly). In some embodiments, the diagnostic LED 542 may light up at a certain frequency (e.g., blink) or following a certain pattern to provide an indication of the status of the actuator 502. This may provide an indication to workers working near the actuator 502 of the status of the actuator 502 or the capacitor 504.

Still referring to FIG. 5, memory 532 may be configured to store various modules that may calculate the desired charge voltage ($V_D$) (i.e., a maximum voltage level that the terminal of the super capacitor 504 reaches). In this exemplary embodiment, memory 532 is shown to include main actuator controller 524, capacitance module 508, energy module 510, and current source module 512. However, in some embodiments, memory 532 includes more modules and/or excludes one or more of the modules shown in FIG. 5. For example, memory 532 may include one module that completes both calculations performed by energy module 510, current source module 512, and capacitance module 508. In some embodiments, the modules stored in memory 532 can be hardwired or programmable logic circuitry and combinations thereof.

In some embodiments, capacitance module 508 is configured to determine a capacitance (C) of a super capacitor (e.g., capacitor 504). In some embodiments, capacitance module 508 receives inputs from memory 532. The inputs may correspond to the voltage measured across the super capacitor or across the super capacitor branch as described herein at time $t_1$ and the voltage measured across the super capacitor or across the super capacitor branch as described herein at time $t_2$; voltages $V_1$ and $V_2$ respectively. Using these voltage readings as well as a safety factor (S), capacitance module 508 may determine the capacitance of the super capacitor using Equation 1:

$$C = S\frac{(V_1 - V_2)}{(t_1 - t_2)} \quad (1)$$

In some embodiments, the difference between $t_1$ and $t_2$ is a predetermined length of time. Advantageously, this may ensure that the time between each voltage measurement is consistent for calculating the capacitance for each power cycle of the power supply. In other embodiments, the difference between $t_1$ and $t_2$ may be variable and may depend on a specific voltage threshold of $V_1$ or $V_2$. In some embodiments, capacitance module 508 outputs the determined capacitance (C) to energy module 510 and current source module 512 to be used in other calculations. In some embodiments, the safety factor (S), may be included to provide a factor of safety into equation 1 and may be any value including 1, <1 (e.g., 0.4, 0.6, 0.8, 0.9, etc.) or >1 (e.g., 1.1, 1.2, 1.3, 1.4, 1.5, etc.).

In some embodiments, capacitance module 508 is configured to determine a capacitance (C) of a super capacitor (e.g., capacitor 504) using another formula. In some embodiments, capacitance module 508 receives inputs from memory 532. The inputs may correspond to a current across a resistor in series with the super capacitor (e.g., the resistor 517) and the voltage measured across the super capacitor the super capacitor branch as described herein at time $t_1$ and the voltage measured across the super capacitor or across the super capacitor branch as described herein at time $t_2$; currents $i_1$ and $i_2$, respectfully and voltages $V_1$ and $V_2$, respectively. In some embodiments, current across the resistor 517 is determined using by determining voltage drop across the resistor as well the known resistance value of the resistor 517 (i.e., i=V/R). Using these voltage readings and current readings as well as a safety factor (S), capacitance module 508 may determine the capacitance of the super capacitor using Equation 2:

$$C = S\int_{t_1}^{t_2} \frac{(i_1 - i_2)}{(V_1 - V_2)} \quad (2)$$

In some embodiments, the difference between $t_1$ and $t_2$ is a predetermined length of time. In other embodiments, the difference between $t_1$ and $t_2$ may be variable and may depend on a specific voltage threshold of $V_1$ or $V_2$. In some embodiments, capacitance module 508 outputs the determined capacitance (C) to energy module 510 and current source module 512 to be used in other calculations. In some embodiments, the safety factor (S) is the same value as the safety factor of Equation 1. In other embodiments, the safety factor (S) is the a different value as the safety factor of Equation 1. As described herein, the determined capacitance (C) may be determined using Equation 1 or Equation 2.

In some embodiments, capacitance module 508 is configured to determine the residual life of the super capacitor by measuring a residual life ratio (RL) for the capacitor over an average number of charges (e.g., 10 charges). For example, the capacitance module 508 may receive inputs from memory 532. The inputs may correspond to the voltage measured across the super capacitor at time $t_1$ and the voltage measured across the super capacitor at time $t_2$; voltages $V_1$ and $V_2$ respectively. In some embodiments, $t_1$ is the time the super capacitor began charging and time $t_2$ is the time the super capacitor was fully charged. Using these voltage readings, for multiple different charging events, capacitance module 508 may determine the average capacitance during an initial (e.g., the first 10) chargings (e.g., power cycles of the power supply) of the super capacitor ($\overline{C}_l$), and the average capacitance during another n (e.g., the $50^{th}$-$60^{th}$) chargings of the super capacitor ($\overline{C_k}$), where capacitance is determined as described as described with respect to Equation 1 or Equation 2 and herein, and calculate the RL using Equations 3, 4, and 5:

$$\overline{C_\iota} = \frac{\sum_{t=1}^{n} C_t}{n} \quad (3)$$

$$\overline{C_k} = \frac{\sum_{t=k}^{k+n} C_t}{n} \quad (4)$$

$$RL = \frac{\overline{C_k}}{\overline{C_\iota}}\Big) \quad (5)$$

In some embodiments, a residual life ratio (RL) of 0.85 may indicate that the super capacitor has begun failing and may soon require replacement. In other embodiments, a RL of 0.82 may indicate that the super capacitor has failed and requires replacement. The RL ratio may be used as described herein to provide an indication of the life left in the super capacitor. In some embodiments, the RL ratio may be used to determine if the super capacitor should be replaced and may be provided to the various components of the BMS controller 366 or the client devices 448 to provide a warning or indication of super capacitor life.

In some embodiments, energy module 510 is configured to determine the energy value ($W_r$) used for a device (e.g., actuator 502) to return to a default position after losing power. Additionally, the calculation of $W_r$ may be stored in non-volatile memory (e.g., memory 532). After $W_r$ is determined by energy module 510, the value of $W_r$ may be output to current source module 512. In some embodiments, energy module 510 calculates $W_r$ by taking the difference between two values of energy, initial energy $W_i$ and final energy $W_f$. $W_i$, $W_f$, and $W_r$ is determined using Equation 6, Equation 7, and Equation 8, respectively:

$$W_i = \frac{1}{2}CV_i^2 \quad (6)$$

$$W_f = \frac{1}{2}CV_f^2 \quad (7)$$

$$W_r = S(W_i - W_f) \quad (8)$$

where C is the calculated capacitance from capacitance module 508, $V_i$ is the voltage across the super capacitor when actuator 502 is at an initial position $P_i$, $V_f$ is the voltage across the super capacitor when actuator 502 is at a final position $P_f$, and S is a safety factor which may or may not be equal to the safety factor of Equations 1 and 2.

In some embodiments, current source 514 is configured to provide a fixed current to super capacitor 504 until a threshold voltage is reached. Current source 514 can be controlled by current source module 512 which is configured to determine a desired charge voltage ($V_D$) (e.g., a voltage level to which super capacitor should be charged at its terminal). The current source 514 provides the charge current $I_C$ as a fixed value in some embodiments.

In some embodiments, current source 514 can be any device that provides a constant current output to a circuit, regardless of changes in the resistance or load of the circuit (e.g., super capacitor 504). Some examples of current sources include current regulators. The current $I_C$ can be provided as a fixed direct current or as a pulse width modulated signal. Current source 514 may include a number of components (e.g., MOSFETs, transistors, resistors, diodes etc.) for controlling current output.

In some embodiments, memory 532 further includes an artificial intelligence (AI) module 540. AI module 540 may be communicably coupled with the other modules or components of the memory as well as the main actuator controller 524 and may be configured to determine the target voltage, effect series resistance, and the desired voltage discussed above. AI module 540 optimize the life of the capacitor 504 by implementing a machine learning algorithm to correlate one or more variables (e.g., $V_c$, $W_f$, $W_i$, $W_f$, $V_D$, $I_c$, etc.). In some embodiments, the AI module 540 may implement a model (e.g., a linear regression model, a logistic regression model, a Naïve Bayes classifier, a clustering model, etc.) to correlate the various variables described herein and instruct the main actuator controller 524 to implement one or more different values. In one example, the AI module 540 may correlate the control charge voltage or charge current to the life of the capacitor 504 and therefore determine an optimal desired voltage to be applied to the capacitor 504 at various points in time. In another example, the AI module 540 may determine an optimal initial and final energy of the actuator 502 to reach an optimal lifetime of the capacitor 504 to then provide the optimal initial and final energy of the actuator to the main actuator controller 524.

With reference to FIG. 6, a charging system 600 can be used in actuator 502, other equipment used in building 10 (FIG. 1), or in other applications. Charging system 600 includes a charger 610 coupled with an energy source 612. Energy source 612 includes a single super capacitor 616 or includes a bank of super capacitors including super capacitors 616 and 618. The bank can include any number of super capacitors.

Charger 610 includes a control circuit 650, an effective series resistance sensor 660, and a fixed current source 670 in some embodiments. Control circuit 650 controls the provision of current by fixed current source 670 to energy source 612. Control circuit 650 is configured to cause current source 670 to provide a fixed current to energy source 612 until a threshold or desired voltage is reached. Control circuit 650 is configured to determine a desired charge voltage ($V_D$) (i.e., a voltage level to which super capacitors 616 and 618 should be charged). Exemplary calculations of the desired charge voltage are discussed above. Control circuit 650 or charger 610 can include a voltage sensor to determine when the desired voltage has been reached and can provide a control signal to control current source 670 in response to the comparison of the measured voltage and the desired voltage.

The desired voltage is a function of effective series resistance which is provided to control circuit 650 from sensor 660 in some embodiments Effective resistance sensor 660 can be any device or computer that determines an internal resistance measurement for energy source 612 (e.g., by DC resistance methods, AC impedance spectroscopy, and pulse discharge techniques).

Since the desired voltage is higher than the target voltage, differences in voltage from super capacitors 616 and 618 do not need to be immediately shunted to balance the energy stored per device. In order to maintain the reliability of the failsafe mechanism, shunting and balancing operations are performed once the desired energy, as reflected by the stack voltage, is achieved in some embodiments. Thus, while there is a period of time required to achieve a balanced configuration, the total energy remains above the desired amount and time can be saved as shunting and balancing can be performed after energy source 612 is ready for failsafe operations.

Control circuit 650 can be implemented in software, hardware or combinations thereof. Control circuit 650 can include an LTC3350 software device driver. A software implementation can use frequent measurements of the voltage at energy source 612 and gradually applying balancing operations to energy source 612 after desired voltage is reached and as the charging current is declines. A hardware implementation can use ESR values stored in on-chip memory multiplied by the charging current as measured by the control circuit 650. Comparators can be used to alter charging of individual super capacitors 616 and 618, such as with bypass shunts, to achieve a balanced configuration once the target energy storage is achieved. A constant voltage phase of charging can be used after the target energy storage is reached. Charger 610 can include a voltage regulator for providing the constant voltage operation under control of control circuit 650.

With reference to FIGS. 6 and 7, a flow 700 can be used to charge energy source 612. At an operation 702, the effective series resistance of the energy source 612 is determined. The effective series resistance can be determined, calculated or sensed. The effective series resistance can be determined by a variety techniques including but not limited to using voltage and current measurements, RC time constants, product specifications, etc. Operation 702 can be performed periodically, at initialization, after reset, after each failsafe operation, etc.

At an operation 704, a fixed current is provided to the energy source via a current source. The fixed current can be 0.5 to 2 Amp DC current in some embodiments. The fixed charging current can be selected based upon device specifications—maximum or optimal charging current and capabilities of the charger 610. The charging current can be a pulse width modulated signal in some embodiments. The charging current can be adjusted for temperature and other parameters.

At an operation 706, the voltage at energy source 612 is compared to the target voltage plus the current multiplied by the effective series resistance. If the voltage is lower than the target voltage plus the current multiplied by the effective series resistance, the provision of the charge current is continued at operation 704. If the voltage is equal to or less than the target voltage plus the current multiplied by the effective series resistance, the provision of the charge current is stopped at operation 708. After operation 708, energy source 612 is available for a failsafe operation.

After operation 708, a second stage of charging can be entered to balance or shunt super capacitors in energy source 612. A fixed voltage can be provided at the desired voltage level for balancing and shunting among individual supercapacitors while energy source remains available for the failsafe operation in some embodiments.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, color, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of charging a capacitor in a failsafe device, the method comprising:

receiving a capacitor voltage level at the capacitor;

receiving an effective series resistance of the capacitor;

providing a charging current to the capacitor until the capacitor voltage level reaches a threshold voltage level, the threshold voltage level being above a target voltage, the target voltage being a voltage level associated with enough energy being stored for a failsafe operation, wherein the threshold voltage level is equal to the target voltage plus the effective series resistance of the capacitor multiplied by the charging current.

2. The method of claim 1, further comprising:

sensing the effective series resistance of the capacitor.

3. The method of claim 2, wherein the charging current is a fixed current.

4. The method of claim 1, wherein the charging current is a fixed current.

5. The method of claim 2, wherein the effective series resistance is calculated for the capacitor periodically.

6. The method of claim 2, wherein the effective series resistance is sensed for the capacitor periodically.

7. The method of claim 1, further comprising:

moving an actuator to a failsafe position using energy stored in the capacitor.

8. The method of claim 1, wherein the capacitor is a super capacitor.

9. The method of claim 1, wherein the capacitor comprises a plurality of super capacitors.

10. The method of claim 9, wherein the plurality of super capacitors are coupled in parallel, and the method further comprises:

providing a fixed voltage at the threshold voltage level for balancing and shunting the super capacitors, the super capacitors are at least two super capacitors.

11. A charger for a capacitor in a failsafe device, the charger comprising:

a circuit configured to provide a charging current to the capacitor until a threshold voltage level is reached, the threshold voltage level being above a target voltage, the target voltage being a voltage level associated with enough energy being stored for a failsafe operation, the circuit being configured to calculate the threshold voltage level as the target voltage plus an effective series resistance of the capacitor multiplied by the charging current.

12. The charger of claim 11, further comprising:

a sensor configured to sense the effective series resistance of the capacitor.

13. The charger of claim 11, wherein the charging current is a fixed current.

14. The charger of claim 11, wherein the circuit comprises a processor configured to execute software instructions for controlling provision of the charging current.

15. The charger of claim 11, wherein the circuit comprises a current source configured to provide the charging current.

16. A failsafe device assembly, comprising:

an actuator;

a capacitor; and a processing circuit comprising a processor and memory, the memory having instructions stored thereon that, when executed by the processor, cause the processing circuit to:

determine a target voltage associated with an amount of energy stored in the capacitor required to return the actuator from an initial position to a failsafe position;

provide a current to the capacitor until a threshold voltage level is reached, the threshold voltage level being above the target voltage; and calculate the threshold voltage level as the target voltage plus an effective series resistance of the capacitor multiplied by the current.

17. The failsafe device assembly of claim 16, the memory having further instructions stored thereon that, when executed by the processor, cause the processing circuit to:

determine the effective series resistance of the capacitor.

18. The failsafe device assembly of claim 16, wherein the threshold voltage level is equal to the target voltage plus the effective series resistance of the capacitor multiplied by the current.

19. The failsafe device assembly of claim 16, further comprising a current source controlled by the processor configured to provide the current.

20. The failsafe device assembly of claim 16, wherein the capacitor comprises one or more super capacitors, wherein instructions, when executed by the processor, cause the processing circuit to:

provide a fixed voltage at the threshold voltage level for balancing and shunting the one or more super capacitors, the one or more super capacitors are at least two super capacitors.

* * * * *